T. C. PROUTY.
SPEED INDICATING DEVICE.
APPLICATION FILED JAN. 16, 1914. RENEWED JAN. 10, 1919.
1,314,364. Patented Aug. 26, 1919.
3 SHEETS—SHEET 1.
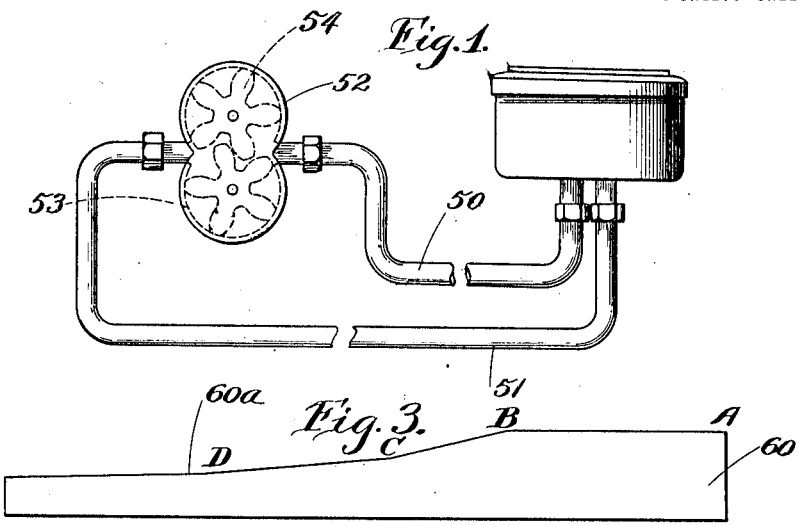
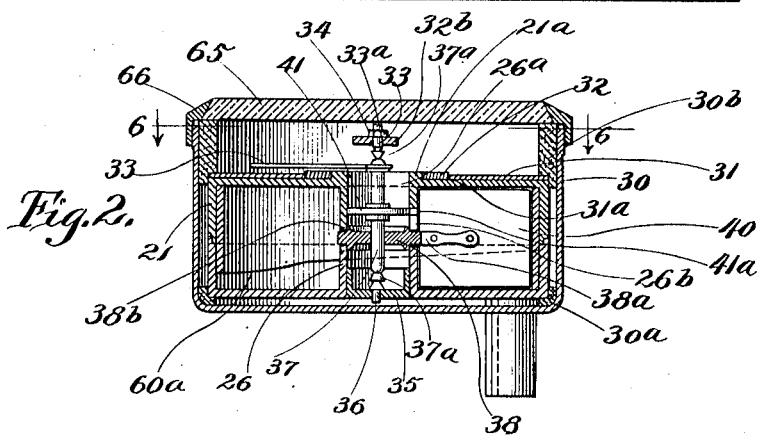
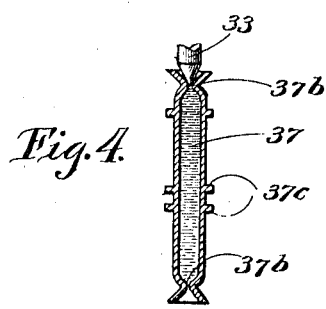
Witnesses:
C. Burnap
Henry A. Parks
Inventor:
Theodore C. Prouty
By Sheridan, Wilkinson & Scott
Att'ys T. C. PROUTY.
SPEED INDICATING DEVICE.
APPLICATION FILED JAN. 16, 1914. RENEWED JAN. 10, 1919.
1,314,364.
Patented Aug. 26, 1919.
3 SHEETS—SHEET 2.
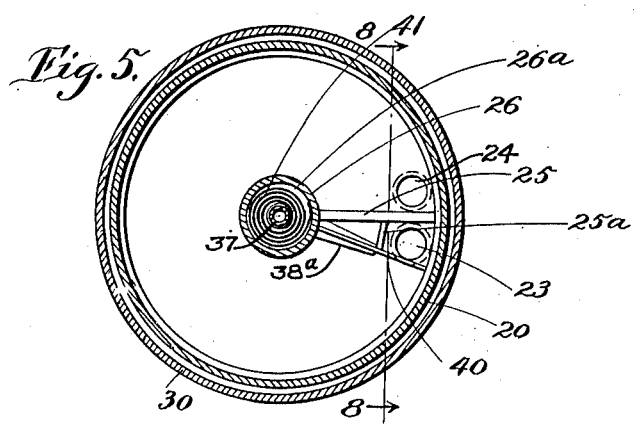
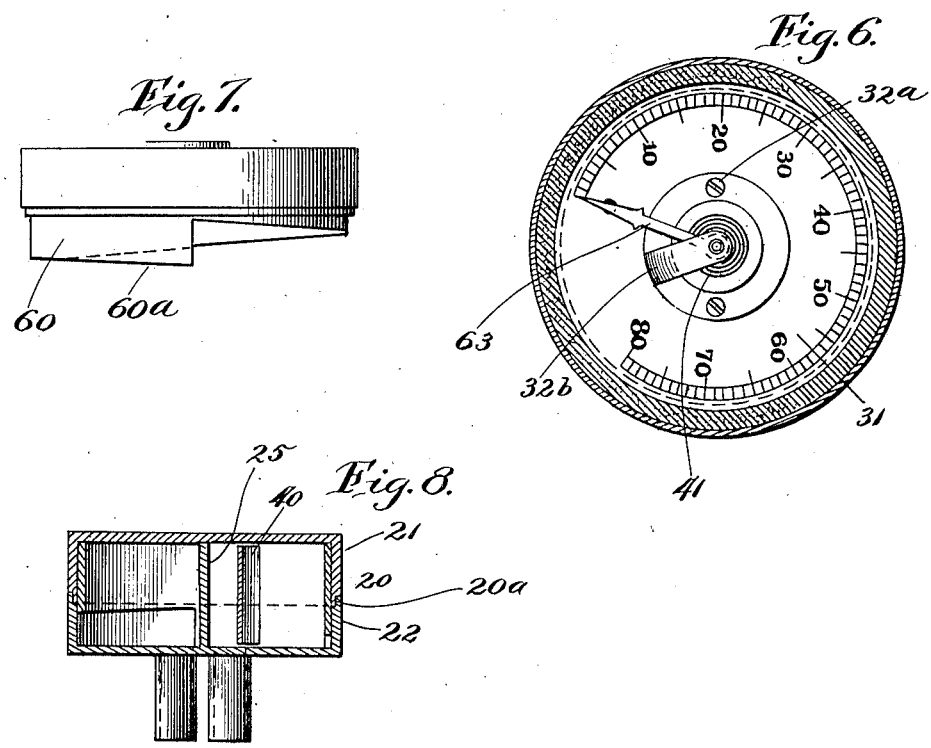
Witnesses:
C. C. Burnap
Henry A. Parke
Inventor:
Theodore C. Prouty
By Sheridan, Wilkinson & Scott Attys

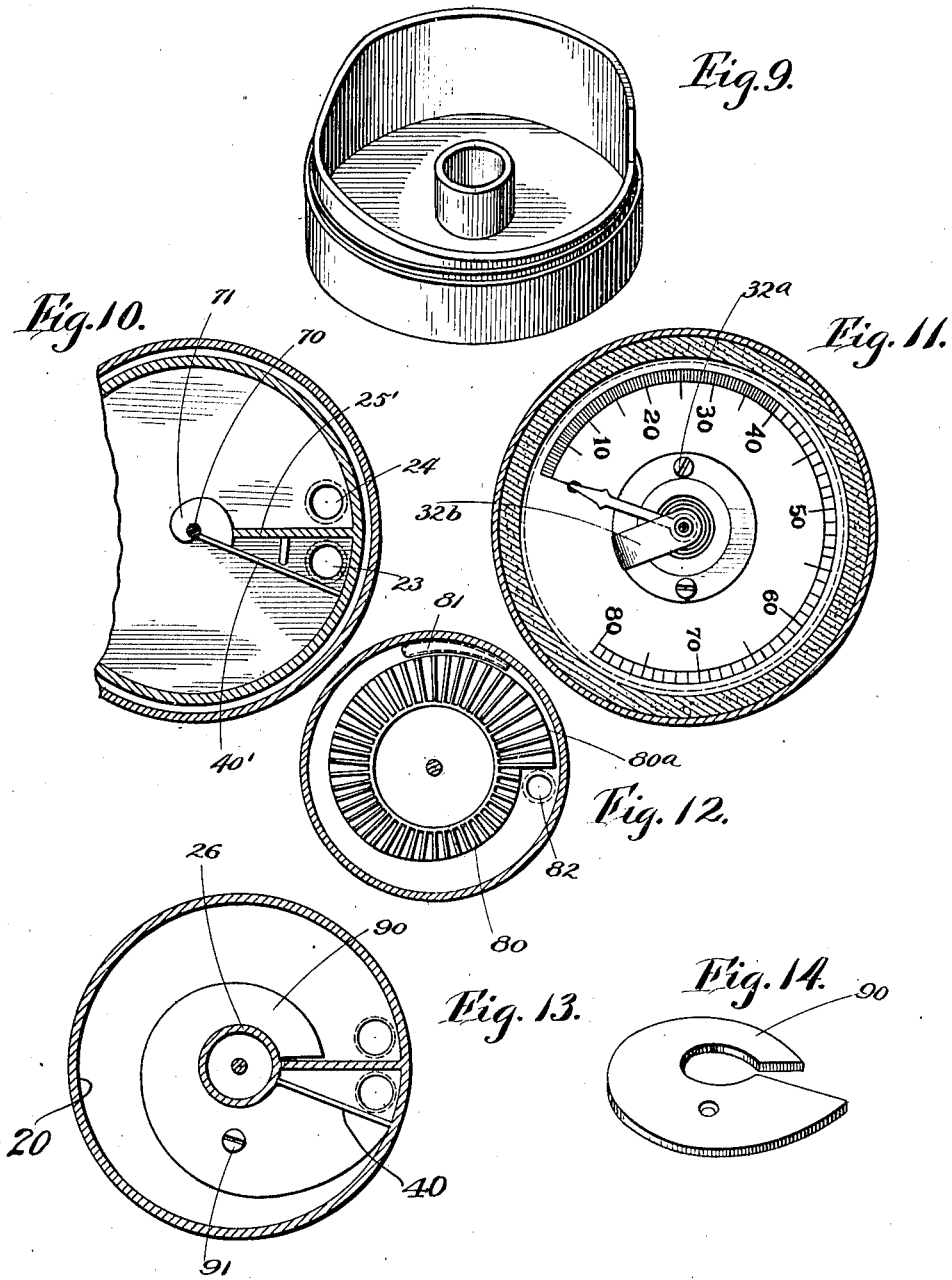

UNITED STATES PATENT OFFICE.

THEODORE C. PROUTY, OF AURORA, ILLINOIS, ASSIGNOR, BY MESNE ASSIGNMENTS, TO THE VAN SICKLEN COMPANY, A CORPORATION OF ILLINOIS.

SPEED-INDICATING DEVICE.

1,314,364.      Specification of Letters Patent.      Patented Aug. 26, 1919.

Application filed January 16, 1914, Serial No. 812,519. Renewed January 10, 1919. Serial No. 270,585.

*To all whom it may concern:*

Be it known that I, THEODORE C. PROUTY, a citizen of the United States, residing at Aurora, in the county of Kane and State of Illinois, have invented certain new and useful Improvements in Speed-Indicating Devices, of which the following is a specification.

This invention relates to improvements in speed indicating devices and relates primarily to that class of devices utilizing the movement of a fluid by operation of means directly actuated from the rotating element whose speed is to be indicated.

The principal object of my invention is to provide a speedometer capable of use in indicating the speed of a moving vehicle by utilizing a pump or the like directly operated by a wheel or other rotating element of the vehicle in combination with an actuatable and indicating means. This movement will be proportional to the speed or movement of the pump.

I am aware that hitherto a number of attempts have been made to construct fluid operated speedometers, but in all such devices the inventors have failed to recognize the fact that in the first place the amount of fluid actuated by the pump is not directly proportional to the varying speeds of the pump, and in the second place the operation of the actuatable member is subject to certain conditions which would normally prevent its uniform movement; that is, movement proportional to the speed of the pump or the like.

I provide a practicable and efficiently operated speed indicating device in which I provide a compensating or what I term a calibrating means arranged to present a varying passage for the actuating fluid, this passage being designed to vary the passage of the fluid to meet the varying conditions both in the movement of the fluid and in the movement of the indicating and actuatable member so as to produce movement of the indicator, proportional to the speed of the vehicle or the like, which, as will be apparent, is a necessary condition for a practical device of this nature.

In the specific embodiment set forth and shown in this application, I provide a chamber to which fluid is supplied in varying volumes according to the speed of the vehicle and the pump or the like. In this casing is rotatably or oscillatably mounted the vane element connected or formed with an indicating member which in turn coacts with a dial or the like to indicate the position of the vane member and hence the speed of the vehicle. To provide uniform movement, as stated above, of the vane element, I provide in the casing, a by-pass of varying cross section leading to the fluid outlet and forming a part thereof, the calibrating member or means mentioned above being constructed to vary this by-pass to afford exact calibration to compensate for the conditions normally preventing exact indication. This calibrating means may be constructed and arranged in a number of forms. The principle, however, is the same and is as stated above. I also provide means to resist the movement from rest of the vane element and indicating member, such means consisting in the embodiment shown, of a coil hair spring which also serves to return the element in each instance, to normal or rest position.

Other objects of my invention are to provide improved construction of the details for the carrying out of my main object as will be set forth hereinafter, and as shown in the accompanying drawings, in which;

Figure 1 is a side elevation of one embodiment of my invention;

Fig. 2 is a vertical section through the casing of the speedometer proper;

Fig. 3 is a developed view of a calibrating ring;

Fig. 4 is a vertical section of a hollow shaft or staff;

Fig. 5 is a horizontal section of the casing showing the vane in rest position;

Fig. 6 is a vertical section along the line 6—6 of Fig. 2;

Fig. 7 is a side elevation of a portion of the casing and calibrating ring;

Fig. 8 is a vertical section through the casing along the line 8—8 of Fig. 5;

Fig. 9 is an inverted perspective of the top portion of the casing and calibrating ring;

Fig. 10 is a horizontal section of a modification;

Fig. 11 is a view similar to Fig. 6 showing a modified dial marking;

Fig. 12 is a horizontal section showing a modification of my invention;

Fig. 13 is a similar section showing another modification;

Fig. 14 is a perspective of the calibrating member shown in Fig. 13.

Like numerals refer to like elements throughout the drawings, in which;

20 designates generally the inner casing comprising the top portion 21 and lower portion 22, the contacting edges being interfitting to provide a close joint, as indicated by numeral 20ª, (see Fig. 8). This casing is substantially air-tight, save for the inlet and outlet apertures 23—24, respectively. Extending upwardly from the lower casing 22 is the abutment or wall 25 adapted to contact with and abut against the top of casing portion 21. Centrally located in the casing 20 is the column 26, (see Fig. 5 for example) this column being centrally apertured as indicated by numeral 26ª and preferably formed in two sections, the one projecting downwardly from the top casing portion 21 and the other projecting upwardly from the bottom casing portion 22, a space or slot being left between the adjacent edges of the two column portions, as shown in Fig. 2. The inner casing is mounted inside of an outer casing designated by numeral 30, the former being spaced from the latter by strips 30ª at the bottom thereof, and spacing ring 30ᵇ at the top thereof. A dial 31 is mounted on and carried by the upper surface of top casing portion 21 and this dial is suitably inscribed with lines and figures to represent various speeds. The dial is centrally apertured at 31ª and a ring 32 is located therein, this ring closely fitting around a peripheral flange 21ª centrally located in the upper surface of top casing portion 21. This ring 32 may be secured to the latter by screws 32ª or the like and provided with the inwardly extending arm 32ᵇ spaced therefrom and carrying the pivot 33, threaded thereinto (see Figs. 2 and 6) the latter being locked in place by the nut 34 engaging the threaded end 33ª thereof. A cap 35 is located in the opposite end of the column 26 and also carries a pivot 36. Pivotally supported between the pivots 33 and 36 is the shaft 37 provided with the cups or seats 37ª engaging the pivots. This shaft 37, as shown in Fig. 4 is formed hollow for the purpose of containing a supply of lubricant and is slightly apertured, as indicated by numerals 37ᵇ at each end to permit flow of such lubricant to the pivots thereby providing a constant lubricating supply, as will be apparent, the apertures 37ᵇ being restricted to prevent free flow of such lubricant. Mounted upon and secured to shaft 37 is the disk or collar 38 provided with an outwardly extending arm 38ª bifurcated at its extremity. Adjacent its outer periphery this collar is provided with the upwardly extending circular flanges 38ᵇ constructed to closely fit the interior of collar 37, the outer portion of the collar 38 fitting in the slot between the top and bottom portions of column 26. A movable vane or vane element 40 is secured by rivets or the like to the bifurcated extremity of arm 38ª and is adapted to rotate with the shaft 37, as will be apparent. This vane 40 extends substantially from the column 26 to the inner side of casing 20, and from the top to the bottom thereof, clearance being left on all four sides to permit unhampered movement of said vane. A coiled hair spring 41 is mounted within the column 26 with one end 41ª seated in a small slot 26ᵇ in the column 26. The other end of this spring 41 is attached to shaft 37 between the flanges 37ᶜ thereof. The purpose of this hair spring 41 is to resist movement of the vane 40 from its position of rest, shown in Fig. 5, thereby operating to return the same to such position when not in operation. A stop 25ª is attached to the fixed vane 25 which extends from the column 26 to substantially the inner casing 20, a slight space therebetween being left for a purpose to be described later. The stop 25ª prevents the spring 41 from moving vane 40 over the inlet aperture 23, as is clearly shown in Fig. 5. Tubes or conduits 50 and 51 may be provided leading from the inlet and outlet of the casing 20 to and from the fluid actuating mechanism, generally indicated by numeral 52, and as shown in Fig. 1, comprising interfitting compressor cogs 53 and 54. By providing the two tubes or conduits 50 and 51, a closed circulation may be provided but it is obvious that when, for example, air is used, the tube leading from the outlet may be dispensed with, if so desired. The actuating cogs 53—54 will be connected by gearing, shafting, or the like, to a rotating element of the vehicle whose speed is to be indicated or in the case of a rotating shaft to drive mechanism carried by said shaft.

As I have found from experiment and tests, the speed of the rotating element and consequently the speed of the fluid actuating cogs 53 and 54, is not proportional to the amount of air or fluid impelled thereby so that assuming my device to be in operation and air or other fluid to be pumped through inlet aperture 23 while the action of such pumping or flow would be to move the vane 40 from its position at rest, shown in Fig. 5, a certain distance, this distance would not be proportional in every instance to the speed of the rotating element. Furthermore, the action of the coiled spring 41 is to resist such movement, such resistance increasing as the vane is moved farther and farther from its position at rest.

These and other conditions operate to greatly complicate the operation and production of an efficient speed indicating device, and to compensate for such condition, I provide what I term a compensating ring or member, indicated by numeral 60, (see Fig. 7, for example), fitting into and carried by the top casing portion 21. This compensating ring is constructed with the inclined or cut-away edge 60ª arbitrarily determined. (See Fig. 3, for example.)

It is obvious in the operation of the device with the ring 60 in place between the outer end of vane 40 and inner wall of casing 20, that fluid flowing through inlet 23 will escape principally through the passage formed by the outer edge of the vane 40, edge 60ª, ring 60, inner wall of casing 20, and bottom of casing 20. Owing to the slight clearance between the sides of the vane and the column and casing, a certain amount of fluid will also escape therearound. This escape, however, may be also compensated for by the calibrating ring 60. As will be apparent, when the form of calibrating ring 60 has been determined—and it is to be noted that this form approximates that shown in Fig. 3, for example—it will be the same for all instruments similar in size, structure, etc.

It will be apparent that the by-pass afforded for the escape of fluid from behind the vane 40, will be substantially uniform when the vane is traveling from rest along the portion indicated, between A—B, Fig. 3; from B to C this by-pass will increase in cross-sectional area;—a slightly lesser increase will take place from C to D, and so on. By the use of this compensating member, therefore, I am enabled to vary the cross-sectional outlet for the actuating fluid, and it will be obvious that by exact construction of the compensating ring, the position of the vane 40 may be accurately determined for any speed of the actuating cogs 52—53, and consequently for any speed of the rotating element. To accurately indicate this speed, I provide an indicator 63, secured to the shaft 37, and traveling above and over the surface of the dial 31 to coact with the spacings and figures thereon to indicate the speed of the rotating element of the vehicle.

The disk or collar 38 serves to accurately center and hold the shaft 37, at the same time preventing any considerable leakage therethrough from behind the vane 40. To protect the parts from dust, etc., a heavy glass cover plate 65 may be secured on the spacing strip 30ᵇ by the clamping ring 66, as clearly shown in Fig. 2, this glass plate not only serving to protect the mechanism, but to enable easy reading of the indications. By forming the spacing strip 30ª and ring 30ᵇ of some elastic material, I am enabled to rigidly support the mechanism and at the same time protect it from shocks and the like.

In Fig. 10 I have shown a slight modification, in which I dispense with the calibrating ring 60 and column 26 and substitute therefor, a staff or spindle 70 to which is directly secured the movable vane 40'. A fixed vane 25' extends inwardly from the inner casing 20 and terminates short of the spindle 70 and the regularly shaped cam 71 is carried by the vane 40' and spindle 70, this cam 71 being adapted to fill the space between the inner end of fixed vane 25' and spindle 70 when in position of rest, shown in Fig. 10. As the vane 40' moves from rest, a varying by-pass is provided between the cam 71 and fixed vane 25', as will be apparent. In this form the cam is arbitrarily formed to provide the right compensation or calibration and constitutes a calibrating member to accomplish the same function as the ring 60, shown in preceding figures.

In Fig. 11 I have shown a form of device similar to that shown in Figs. 1 to 9, the sole difference being in the form of dial used, considerable less distance being used, for example, to indicate the speed of zero to forty miles than from forty upward, so as to provide a speed indicator especially adapted to racing vehicles to render reading of speed indications easy when vehicle is traveling at racing speed. This form of dial may be utilized by providing a suitable calibrating member to compensate for the different proportion of movement for the different indications.

In Fig. 12 I have shown another modification, in which, in place of a single movable vane, such as 40, I provide a fan 80 comprising a plurality of vanes 80ª of varying length, as clearly shown in the drawing. In this form of my invention I provide an inlet nozzle 81 adapted to supply actuating fluid to the vanes of the fan 80. An outlet 82 leads from the casing and is indicated in the drawing. As the speed of the vehicle is increased, and consequently the amount of impelling fluid per unit of time is increased, the fan 80 will be rotated, the by-pass between such fan and the wall of the casing at the same time increasing so that a calibrating effect similar to that shown in preceding forms, will attain, this calibrating effect to be determined by experiments and tests in the first instance and effected by varying the length of individual vanes accordingly.

In Fig. 13 I have shown still another form of modification in which a calibrating plate or cam 90 is secured in the bottom of the inner casing by screw 91 or the like, this plate 90 being of irregular contour to provide a by-pass of varying cross-section between its outer edge and the inner wall of the casing 20, the vane 40 being adapted to travel thereover and the calibrating effect being similar to that shown and described in the preceding forms.

In Fig. 14 I have shown a perspective of the cam plate 90.

It will be obvious that my speed indicating mechanism enables accurate indication for varying speeds, and is inexpensive to manufacture and efficient in operation.

It will also be apparent that my device is susceptible of many modifications, and I do not wish to be restricted to the form shown or described beyond the scope of the appended claims.

What I claim is:—

1. A fluid actuated speed indicator comprising in combination, a casing, a rotatable indicating member, a vane operatively attached to said member and mounted in said casing, said casing being provided with an inlet and an outlet, and a calibrating member carried at the bottom of said casing and having a calibrated edge beneath said vane to provide at all positions of said vane a calibrated passage for actuating fluid between said inlet and outlet passages.

2. A fluid actuated speed indicator comprising in combination, a casing, a rotatable indicating member, a vane operatively attached to said member and mounted in said casing, said casing being provided with an inlet and an outlet, and a calibrating member detachably mounted on the bottom of said casing and having a calibrated edge beneath said vane to provide at all positions of said vane a calibrated passage for actuating fluid between said inlet and outlet passages.

In testimony whereof, I have subscribed my name.

THEODORE C. PROUTY.

Witnesses:
HENRY A. PARKS,
EDYTHE M. ANDERSON.